United States Patent
Pressley et al.

(10) Patent No.: US 6,969,734 B1
(45) Date of Patent: Nov. 29, 2005

(54) AQUEOUS POLYMER DISPERSION AND METHOD OF USE

(75) Inventors: Ozzie Moore Pressley, Cheltenham, PA (US); Wei Zhang, Maple Glen, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 10/985,706

(22) Filed: Nov. 10, 2004

(51) Int. Cl.$^7$ ............................................. C08K 5/15
(52) U.S. Cl. ...................... 524/115; 524/115; 524/253; 524/425; 427/420; 427/427.4; 428/430; 428/450
(58) Field of Search .................. 524/253, 115, 425; 427/420, 427.4, 430, 450

(56) References Cited

U.S. PATENT DOCUMENTS

| | | |
|---|---|---|
| 5,415,893 A * | 5/1995 | Wiersma et al. ......... 427/385.5 |
| 5,484,849 A | 1/1996 | Bors et al. |
| 5,534,310 A | 7/1996 | Rokowski et al. |
| 6,177,396 B1 * | 1/2001 | Clapperton et al. ......... 510/405 |
| 6,627,586 B1 * | 9/2003 | Brooks et al. .............. 510/130 |
| 6,649,679 B1 * | 11/2003 | Stockl et al. ............... 524/253 |
| 2002/0107322 A1 | 8/2002 | Gebhard et al. |
| 2002/0164426 A1 | 11/2002 | Ennis et al. |

FOREIGN PATENT DOCUMENTS

WO    WO 03/011986 A1    2/2003

* cited by examiner

*Primary Examiner*—David W. Wu
*Assistant Examiner*—Mei Q. Huang
(74) *Attorney, Agent, or Firm*—Kim R. Jessum; Gary Greenblatt

(57) ABSTRACT

An aqueous polymer dispersion containing acetoacetoxy functional polymer particles and an alkyl ethoxylated surfactants is provided. A method for preparing a coated substrate employing the aqueous polymer dispersion is also provided. The aqueous polymer dispersion is useful for preparing coatings having improved adhesion to substrates.

10 Claims, No Drawings

AQUEOUS POLYMER DISPERSION AND METHOD OF USE

This invention relates to an aqueous polymer dispersion containing acetoacetoxy functional polymer particles and a surfactant. The aqueous polymer dispersion is useful for preparing coatings having improved adhesion to substrates. Also provided is a method for preparing a coated substrate employing the aqueous polymer dispersion.

Coating compositions, such as paints, are commonly applied to many surfaces, including exterior surfaces that have degraded as a result of weathering or other processes. Often, these exterior surfaces are porous and weak, and are subject to attrition on abrasion. Examples of such surfaces are the chalky surfaces of coatings, which have weathered to an extent that poorly consolidated pigment forms a surface layer on the coating; and masonry surfaces, weathered or not, which have a poorly consolidated surface. A substrate to which a coating is applied may have an entirely friable surface or only portions of the surface may be friable. One problem with such substrates is that aqueous coating compositions applied to these substrates often do not develop the requisite degree of adhesion between the surfaces of the substrates and the newly formed paint film.

U.S. Pat. No. 4,771,100 discloses the use of ethoxylated fatty amines in the preparation of latexes having polymer particles containing about 0.1 to 10 weight percent of copolymerized carboxylic acid monomer. No use of these latexes, in combination with ethoxylated fatty amines, to improve adhesion to friable surfaces was disclosed.

The problem faced by the inventors is the provision of a suitable aqueous coating composition and a method for applying the aqueous coating composition so that adhesion to friable surfaces can be effected. The inventors have found that the adhesion of a coating prepared from an aqueous polymer dispersion containing certain polymer particles can be improved by the addition of a surfactant described below to the aqueous polymer dispersion.

The aqueous polymer dispersion of this invention comprises an aqueous medium; acetoacetoxy functional polymer particles dispersed in said aqueous medium; and at least one alkyl ethoxylated phosphate surfactant comprising a $C_8$ to $C_{18}$ alkyl group attached to a polyoxyethylene chain having an average degree of polymerization in the range of from 20 to 100.

The method for preparing a coated substrate of this invention comprises the steps of: providing an aqueous polymer dispersion comprising: an aqueous medium; acetoacetoxy functional polymer particles dispersed in said aqueous medium; and at least one alkyl ethoxylated phosphate surfactant comprising a $C_8$ to $C_{18}$ alkyl group attached to a polyoxyethylene chain having an average degree of polymerization in the range of from 20 to 100; applying said aqueous polymer dispersion to a substrate; and drying or allowing to dry said aqueous polymer dispersion applied to said substrate to provide said coated substrate.

Glass transition temperature" or "$T_g$" as used herein, means the temperature at or above which a glassy polymer will undergo segmental motion of the polymer chain. Glass transition temperatures of a polymer can be estimated by the Fox equation [*Bulletin of the American Physical Society* 1, 3 Page 123 (1956)] as follows:

$$\frac{1}{T_g} = \frac{w_1}{T_{g(1)}} + \frac{w_2}{T_{g(2)}}$$

For a polymer containing as polymerized units two different monomers, $w_1$ and $w_2$ refer to the weight fraction of the two comonomers, and $T_{g(1)}$ and $T_{g(2)}$ refer to the glass transition temperatures of the two corresponding homopolymers in Kelvin. For polymers containing three or more monomers, additional terms are added ($w_n/T_{g(n)}$). The $T_g$ of a polymer phase can also be calculated by using the appropriate values for the glass transition temperatures of a polymer containing as polymerized units only one type of monomer (homopolymer), which may be found, for example, in "Polymer Handbook", edited by J. Brandrup and E. H. Immergut, Interscience Publishers. The values of $T_g$ reported herein are calculated using the Fox equation.

As used herein, the use of the term "(meth)" followed by another term such as acrylate refers to both acrylates and methacrylates. For example, the term "(meth)acrylate" refers to either acrylate or methacrylate; the term "(meth)acrylic" refers to either acrylic or methacrylic; and the term "(meth)acrylamide" refers to either acrylamide or methacrylamide.

As used herein, the term "aqueous polymer dispersion" refers to a composition containing discrete polymer particles dispersed in an aqueous medium (e.g., aqueous polymer emulsion).

The term "pendant" is used in the specification to mean "attached to the polymer backbone as a side group, but not within the polymer backbone. The term "pendant" also includes attachment of such a group at the termini of a polymer chain.

The aqueous polymer dispersion of this invention contains acetoacetoxy functional polymer particles dispersed in an aqueous medium. The acetoacetoxy functional polymer particles, which are vinyl addition polymers formed by the polymerization of ethylenically unsaturated monomers, have acetoacetoxy functional groups pendant to the polymer backbone. The acetoacetoxy functional groups are represented by:

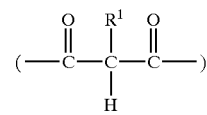

wherein $R_1$ is hydrogen, alkyl having 1 to 10 carbon atoms, or phenyl. Examples of acetoacetoxy functional groups are:

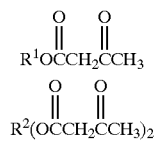

wherein $R^1$ is a divalent radical and $R^2$ is a trivalent radical, that attach the acetoacetoxy functional group to the polymer backbone. Suitable levels of acetoacetoxy functional groups may be in the range of from $4\times10^{-5}$ to $1\times10^{-4}$ mole of acetoacetoxy functional groups per gram of acetoacetoxy functional polymer particles.

The acetoacetoxy functional polymer particles can be prepared by polymerization of acetoacetoxy functional monomer, nonionic monomer, and optionally, ionic monomer.

Acetoacetoxy functional monomers are monomers having an ethylenic unsaturation and one or more acetoacetyl moieties. These acetoacetyl functional monomers have the following structures:

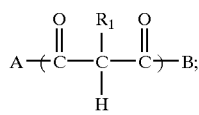

wherein A is either:

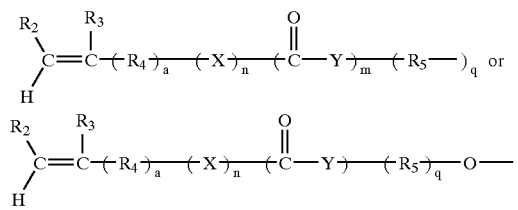

wherein $R_1$ is selected from H, alkyl having 1 to 10 carbon atoms, and phenyl; $R_2$ is selected from H, alkyl having 1 to 10 carbon atoms, phenyl, halo, $CO_2CH_3$, and CN; wherein $R_3$ is selected from H, alkyl having 1 to 10 carbon atoms, phenyl, and halo; wherein $R_4$ is selected from alkylene having 1 to 10 carbon atoms and phenylene; wherein $R_5$ is selected from alkylene having 1 to 10 carbon atoms and phenylene; wherein a, m, n, and q are independently selected from 0 and 1; wherein each of X and Y is selected from —NH— and —O—; and B is selected from A, alkyl having 1 to 10 carbon atoms, phenyl, and heterocyclic groups. Examples of acetoacetoxy functional monomers include, among the following, acetoacetoxyalkyl (meth)acrylates such as acetoacetoxyethyl (meth)acrylate, acetoacetoxypropyl (meth)acrylate, acetoacetoxybutyl (meth)acrylate, and 2,3-di(acetoacetoxy)propyl (meth)acrylate; allyl acetoacetate; vinyl acetoacetate; various acetoacetamides, including, but not limited to:

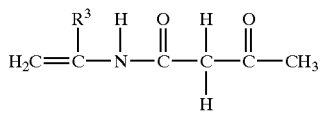

wherein $R^3$ is either H or methyl; and combinations thereof. Preferred acetoacetoxy functional monomers include acetoacetoxyethyl (meth)acrylate, acetoacetoxypropyl (meth)acrylate, allyl acetoacetate, acetoacetoxybutyl (meth) acrylate, 2,3-di(acetoacetoxy)propyl (meth)acrylate, and combinations thereof. Suitable levels of polymerized acetoacetoxy functional monomer in the acetoacetoxy functional polymer particles include from 0.1 to 20 weight %, preferably from 0.5 to 10 weight %, and more preferably from 1 to 6 weight %, based on the weight of the acetoacetoxy functional polymer particles. The acetoacetoxy functional polymer particles contain one or more polymerized acetoacetoxy functional monomers.

The acetoacetoxy functional polymer particles also include as polymerized units nonionic monomer. A nonionic monomer is a monomer that contains at least one ethylenic unsaturated but does not have a pendant acid or base group. Further, nonionic monomer expressly excludes acetoacetoxy functional monomer. Examples of nonionic monomers include styrene; butadiene; α-methyl styrene; vinyl toluene; vinyl naphthalene; ethylene; propylene; vinyl acetate; vinyl versatate; vinyl chloride; vinylidene chloride; various $C_1$–$C_{40}$ alkyl esters of (meth)acrylic acid, such as methyl (meth)acrylate, ethyl (meth)acrylate, n-butyl (meth)acrylate, 2-ethylhexyl (meth)acrylate, cyclohexyl (meth)acrylate, n-octyl (meth)acrylate, n-decyl (meth)acrylate, n-dodecyl (meth)acrylate, tetradecyl (meth)acrylate, lauryl (meth)acrylate, oleyl (meth)acrylate, palmityl (meth)acrylate, and stearyl (meth)acrylate; other (meth)acrylates such as isobornyl (meth)acrylate, benzyl (meth)acrylate, phenyl (meth)acrylate, and 2-bromoethyl (meth)acrylate; alkoxyalkyl (meth)acrylates, such as ethoxyethyl (meth)acrylate; full esters of ethylenically unsaturated di- and tricarboxylic acids and anhydrides, such as diethyl maleate, dimethyl fumarate, and ethyl methyl itaconate. Other suitable nonionic monomers include multiethylenically unsaturated monomers, which are effective for increasing the molecular weight of the copolymer particles. Examples of multiethylenically unsaturated monomers include tripropylene glycol di(meth)acrylate, diethylene glycol di(meth)acrylate, ethylene glycol di(meth)acrylate, 1,6-hexanediol di(meth)acrylate, 1,3-butylene glycol di(meth)acrylate, polyalkylene glycol di(meth)acrylate, diallyl phthalate, trimethylolpropane tri(meth)acrylate, divinylbenzene, divinyltoluene, trivinylbenzene, and divinyl naphthalene. Suitable levels of polymerized nonionic monomer in the acetoacetoxy functional polymer particles include from 70 to 99.9 weight %, preferably from 80 to 99.5 weight %, and more preferably, from 84 to 99 weight %, based on the weight of the acetoacetoxy functional polymer particles. The acetoacetoxy functional polymer particles contain one or more polymerized nonionic monomers.

The acetoacetoxy functional polymer particles optionally include as polymerized units at least one ionic monomer. The polymerized ionic monomer may be included in the acetoacetoxy functional polymer particles to help stabilize the polymer particles in the aqueous medium. As used herein, "ionic monomer" expressly excludes acetoacetoxy functional monomers and nonionic monomers. The ionic monomer may be an anionic monomer or alternatively, a cationic monomer. As used herein, "anionic monomer" refers to an ionic monomer that contains at least one pendant acid group or salt thereof. Anionic monomers include carboxylic acid containing monomers such as (meth)acrylic acid, itaconic acid, fumaric acid, and maleic acid; anhydrides, which can form carboxylic acid monomers in the presence of water, such as itaconic anhydride and maleic anhydride; and partial esters of multicarboxylic acid monomers, such as ethyl maleate. Other examples of acid containing monomers are phosphorus acid monomers such as 2-phosphoethyl (meth)acrylate; and sulfur acid monomers such as sodium vinyl sulphonate, 2-acrylamido-2-methylpropane sulfonic acid, vinyl sulphonic acid, styrene sulphonic acid, sulfoethyl (meth)acrylate, and methacryloxyisopropyl acid sulfophthalate, and hydroxy, dihydroxy, amino or diamino alkyl or aryl sulfonic acids, such as, 1,4-butanediol 2-sulfonic acid. As used herein, "cationic monomer" refers to an ionic monomer that contains at least one pendant base group or salt thereof. Examples of cationic monomers are amine functional monomers such as 2-vinoxyethylamine, 2-vinoxyethylethylene-diamine, 3-aminopropyl vinyl ether, 2-amino-2-methylpropyl vinyl ether, and 2-aminobutyl vinyl ether; and amide containing monomers such as (meth)acrylamide. In certain non-limiting embodiments, the acetoacetoxy functional polymer particle contains as polymerized units both anionic monomer and cationic monomer. Suitable levels of polymerized ionic monomer in the acetoacetoxy functional polymer particles include from zero to 10 weight %, preferably from 0.1 to 6 weight %, and more preferably, from 0.5 to 3 weight %, based on the weight of the acetoacetoxy functional polymer particles. The acetoacetoxy functional polymer particles may contain one or more polymerized ionic monomers.

The types and levels of the acetoacetoxy functional monomer, the nonionic monomer, and the optional ionic monomer may be chosen to provide the acetoacetoxy functional polymer particles with a glass transition temperature suitable for an intended end use. Suitable ranges for the glass transition temperature of the acetoacetoxy functional polymer particles include the range of from −60° C. to 100° C., preferably the range of from −20° C. to 50° C., and more preferably the range of from −10° C. to 40° C.

Typically, the acetoacetoxy functional polymer particles have an average diameter in the range of from 50 nanometers (nm) to 1 micron, preferably in the range of from 60 nm to 500 nm, and more preferably in the range of from 80 nm to 350 nm. The average polymer particle diameter may be determined by a quasi-elastic light scattering technique, using an instrument such as a Brookhaven Model BI-90 Particle Sizer, supplied by Brookhaven Instruments Corporation, Holtsville, N.Y.

Suitable morphologies for the acetoacetoxy functional polymer particles include polymer particles having a single polymer phase; and polymer particles having two or more polymer phases. Examples of polymer particles having two or more polymer phases include core/shell polymer particles in which one polymer phase is fully or partially encapsulated by a different polymer phase; polymer particles having multiple polymer microdomains within a continuous polymer phase; interpenetrating network polymers; and multilobe polymer particles.

The acetoacetoxy functional polymer particles contained in the aqueous polymer dispersion of the present invention may be prepared by well known polymerization techniques, such as suspension polymerization or emulsion polymerization of ethylenically unsaturated monomers. Emulsion polymerization is preferred. Suitable processes are disclosed in U.S. Pat. No. 5,356,968 and U.S. Pat. No. 5,264,530. An alternate process to prepare the acetoacetoxy functional polymer particles is solution polymerization followed by the conversion of the solution polymer to the acetoacetoxy functional polymer particles by various methods known in the art. Suitable polymer processes, which include emulsion polymerization, solution polymerization, and suspension polymerization process, may be conducted as batch, semicontinuous, or continuous processes. Aqueous emulsion polymerization is a preferred process for preparing the acetoacetoxy functional polymer particles. Temperatures suitable for aqueous emulsion polymerization processes are in the range of from 20° C. to less than 100° C., preferably in the range of from 50° C. to 90° C. The polymerization processes commonly employ various synthesis adjuvants such as thermal or redox polymerization initiators, chain transfer agents, catalysts, surfactants, high molecular weight polymers, dispersants, salts, buffers, acids, or bases. Preferably the use of organic solvents is minimized in the polymerization process to provide an aqueous polymer dispersion with low levels of volatile organic compounds (VOCs). The aqueous polymer dispersion containing the acetoacetoxy functional polymer particles is optionally treated to remove VOCs by processes such as steam stripping or distillation.

The aqueous polymer dispersion of this invention also contains an aqueous medium in which the acetoacetoxy functional polymer particles are dispersed. The aqueous medium optionally contains cosolvents including water miscible cosolvents such as methanol, ethanol, propanol, acetone, ethylene glycol ethyl ethers, propylene glycol propyl ethers, and diacetone alcohol; and water immiscible solvents such as propyl acetate, butyl acetate, methyl isoamyl ketone, amyl acetate, diisobutyl ketone, xylene, toluene, butanol, and mineral spirits. The aqueous polymer dispersion may be provided with 10 to 70 weight % polymer particles, based on the weight of the polymer composition. Preferably, one or more bases are added to the aqueous polymer dispersion to raise the pH to a value in the range of from 8 to 11, and more preferably in the range of from 9 to 11, in order to minimize hydrolysis of the pendant acetoacetoxy groups. Suitable bases include ammonia, or primary amines such as ethanolamine, methyl amine, or isopropyl amine.

The aqueous polymer dispersion of this invention also contains an alkyl ethoxylated phosphate surfactant, which may be provided in the acid form or in the salt form. The alkyl ethoxylated phosphate surfactant has an $C_8$ to $C_{18}$ alkyl group attached to a polyoxyethylene chain having an average degree of polymerization in the range of from 20 to 100. The alkyl ethoxylated phosphate surfactant may be represented by the structure:

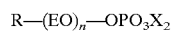

$$R—(EO)_n—OPO_3X_2$$

wherein R is a $C_8$ to $C_{18}$ alkyl group; EO is a polymerized ethylene oxide unit; n is an integer with a value in the range of from 20 to 100; and each X is independently selected from H or a cation. Examples of suitable cations include alkali metal cations such as lithium, sodium, or potassium; ammonia; and amines such as dimethyl amine, triethanol amine, and methyl amine. The aqueous polymer dispersion contains one or more of these alkyl ethoxylated phosphate surfactants. The concentration of the alkyl ethoxylated phosphate surfactant in the aqueous polymer dispersion is typically in the range from 0.1 to 5 weight %, preferably in the range of from 0.1 to 3 weight %, and more preferably in the range of from 0.5 to 3 weight %, based on the weight of the acetoacetoxy functional polymer particles. The alkyl ethoxylated phosphate surfactant may be added to the aqueous polymer dispersion containing the acetoacetoxy functional polymer particles, added to the aqueous medium prior to or during the polymerization of the acetoacetoxy functional polymer particles, or combinations thereof. In one non-limiting embodiment, the alkyl ethoxylated phosphate surfactant included in the aqueous polymer dispersion has a polyoxyethylene chain having an average degree of polymerization in the range of from 25 to 50, and preferably in the range of from 30 to 50. In a different non-limiting embodiment, the alkyl ethoxylated phosphate surfactant has $C_{12}$ to $C_{18}$ alkyl group.

In addition, the aqueous polymer dispersion optionally includes other components, including other polymers, surfactants, pigments such as titanium dioxide, extenders, dyes, pearlescents, adhesion promoters, crosslinkers, dispersants, defoamers, leveling agents, optical brighteners, ultraviolet stabilizers, absorbing pigments, coalescents, rheology modifiers, preservatives, biocides, polymer particles having internal voids, and antioxidants. The aqueous polymer dispersion may contain coalescent in the amount of from 0 weight % to 40 weight %, more preferably 0 weight % to 20 weight %, and most preferably 0 weight % to 5 weight %, based on the weight of the comb copolymer. Preferably, the aqueous polymer dispersion is absent coalescent.

The aqueous polymer dispersion may contain acetoacetoxy functional polymer particles having a multimodal particle diameter distribution, such as a bimodal distribution. In one non-limiting embodiment, the aqueous polymer dispersion contains a small mode of acetoacetoxy functional polymer particles and a large mode of acetoacetoxy functional polymer particles, wherein the small mode has an average particle diameter in the range of from 50 to 150 nm, and the large mode has an average particle diameter of less than 400 nm but larger than the average particle diameter of the small mode. Further, in this non-limiting embodiment, the ratio of the small mode acetoacetoxy functional polymer particles to the large mode acetoacetoxy functional polymer particles may be in the range of from 1:9 to 9:1 by weight.

In one non-limiting embodiment, the aqueous polymer dispersion of this invention further contains at least one unsaturated fatty acid ester. The unsaturated fatty acid ester is a coalescent and lowers the minimum film formation temperature of the polymer particles having pendant acetoacetoxy groups. The unsaturated fatty acid ester is also autoxidizable in the presence of atmospheric oxygen. After formation of a dry film from the aqueous polymer dispersion, the oxidation of the unsaturated fatty acid ester results in the reduction or the elimination of the coalescent activity of the unsaturated fatty acid ester, leading to increased hardness in the dry film. Further, the oxidation of the unsaturated fatty acid ester results in the formation of reactive species, which are capable of increasing the rate of reaction of the pendant acetoacetoxy groups of the coalesced polymer particles forming the dry film and enhancing the rate or the extent of crosslinking in the dry film. Crosslinks may be formed between reacted pendant acetoacetoxy groups, between reacted unsaturated fatty acid esters, or between an acetoacetoxy group and an unsaturated fatty acid ester.

The unsaturated fatty acid esters suitable for use in the composition of this invention are characterized by the chemical structure $R_1C(O)OR_2$, wherein $R_1C(O)O$ is an unsaturated fatty acid component and $R_2$ is an organic group that forms the ester component. The group $R_1$ is a $C_8$ to $C_{28}$ hydrocarbon containing at least one unsaturated bond. The degree of unsaturation of the $R_1$ group is either monounsaturated or polyunsaturated, such as diunsaturated and triunsaturated. Suitable unsaturated fatty acid esters include monounsaturated fatty acids formed from palmitoleic acid, oleic acid, or caproleic acid; diunsaturated fatty acid esters formed from linoleic acid; triunsaturated fatty acid esters formed from linolenic acid or eleosteric acid, or mixtures thereof. Preferred are unsaturated fatty acid esters formed from monounsaturated, diunsaturated fatty acids, or mixtures thereof. More preferred are unsaturated fatty acid esters formed from diunsaturated fatty acid. The organic group, $R_2$, which forms the ester component of the unsaturated fatty acid ester, typically contains from 1 to 8 carbon atoms, and includes substituted or unsubstituted alkyl groups containing from 1 to 8 carbons, and alkyl ether groups. Examples of suitable unsubstituted alkyl groups include alkyl groups such as methyl, ethyl, n-propyl, isopropyl, and t-butyl groups. Examples of suitable substituted alkyl groups include alkyl groups containing alcohol moieties such as organic groups formed from ethylene glycol and propylene glycol. Examples of suitable alkyl ether groups include groups formed from polyethers such as diethylene glycol, triethylene glycol, dipropylene glycol, tripropylene glycol, and diethylene glycol monobutyl ether. Preferred unsaturated fatty acid esters include methyl and ethyl esters of diunsaturated fatty acids; and unsaturated fatty acid esters formed from ethylene glycol or propylene glycol.

Suitable sources for preparing the unsaturated fatty acid esters include unsaturated fatty acids or mixtures of unsaturated fatty acids derived from plant sources such as corn oil, cotton seed oil, peanut oil, olive oil, castor oil, dehydrated castor oil, wheat germ oil, poppy seed oil, safflower oil, soybean oil, and sunflower seed oil.

In one non-limiting embodiment, the aqueous polymer dispersion contains an unsaturated fatty ester or a mixture of unsaturated fatty acid esters having an average iodine number of at least 50, preferably at least 80, and more preferably at least 100. The average iodine number is a measure of the degree of unsaturation of the unsaturated fatty acid ester or the mixture of unsaturated fatty acid esters, and is determined using ASTM method 1959-97. Preferably, the aqueous polymer dispersion of this non-limiting embodiment contains less than 10 weight % triunsaturated fatty acid ester, preferably, less than 8 weight %, and more preferably at least less than 5 weight %, based on the total weight of the unsaturated fatty acid esters contained in the aqueous polymer dispersion.

A volatile organic compound ("VOC") is defined herein as a carbon containing compound that has a boiling point below 280° C. at atmospheric pressure. Compounds such as water and ammonia are excluded from VOCs.

In one non-limiting embodiment, aqueous polymer dispersion of this invention contains less than 5% VOC by weight based on the total weight of the aqueous polymer dispersion; preferably the aqueous polymer dispersion contains less than 3% VOC by weight based on the total weight of the aqueous polymer dispersion; more preferably the aqueous polymer dispersion contains less than 1.7% VOC by weight based on the total weight of the aqueous polymer dispersion. A "low VOC" aqueous polymer dispersion herein is an aqueous polymer dispersion that contains less than 5% VOC by weight based on the total weight of the aqueous polymer dispersion; preferably it contains between 0.01% and 1.7% by weight based on the total weight of the aqueous polymer dispersion.

Typical methods of paint or coating preparation may introduce adventitious VOCs from the aqueous polymer dispersion containing the acetoacetoxy functional polymer particles, biocides, defoamers, soaps, dispersants, or thickeners. These typically account for 0.1% VOC by weight based on the total weight of the aqueous polymer composition. Additional methods such as steam stripping and choice of low VOC containing additives like biocides, defoamers, soaps, dispersants, and thickeners are suitable for further reducing the aqueous polymer composition to less than 0.01% VOC by weight based on the total weight of the aqueous polymer composition.

A method of forming a coated substrate from the aqueous polymer dispersion of this invention includes: providing the aqueous polymer dispersion; applying the aqueous polymer dispersion onto a substrate; drying or allowing to dry the aqueous polymer dispersion that was applied onto the substrate to provide the coated substrate. The aqueous polymer dispersion may be applied onto friable substrates, such as weathered substrates or chalky substrates. The method may be employed for improving the adhesion of a coating to a friable substrate.

The aqueous polymer dispersion may be applied on a substrate using various techniques including, for example, brushing, rolling, drawdown, dipping, with a knife or trowel, curtain coating, and spraying methods such as, for example, air-atomized spray, air-assisted spray, airless spray, high volume low pressure spray, and air-assisted airless spray. The wet coating thickness of the applied aqueous polymer dispersion may be in the range of 1 micron to 250 microns. The aqueous polymer dispersion is applied onto a substrate as a single coat or multiple coats. After application, the applied aqueous polymer dispersion is typically allowed to dry at ambient conditions or alternatively dried by the application of heat to provide a dry coating. Drying is typically allowed to proceed under ambient conditions such as, for example, at 0° C. to 35° C.

The aqueous polymer dispersion is suitable for application onto various substrates including processed timber such as medium density fiber board, chip board, laminates; mineral substrates such as masonry, cement, fiber cement, cement asbestos, plaster, plasterboard, glazed and unglazed ceramic; metal substrates such as galvanized iron, galvanized steel, cold rolled steel, aluminum, wrought iron, drop forged steel, stainless steel; previously painted or primed surfaces (fresh, aged or weathered) including but not limited to acrylic coatings, vinyl acrylic coatings, styrene acrylic coatings, powder coated surfaces, solvent acrylic coatings, alkyd resin coatings, solvent urethane coatings, epoxy coatings; cellulosic substrates such as paper and paperboard; glass; asphalt; leather; wallboard; nonwoven materials; and synthetic substrates such as polyvinyl chloride, polyvinylidene chloride, polyethylene, and polypropylene.

The dry coating prepared from the aqueous polymer dispersion is suitable as a protective coating or an aesthetic coating. Examples of suitable coatings include architectural coatings such as interior and exterior paint coatings, including masonry coatings, wood coating and treatments; floor polishes; maintenance coatings such as metal coatings; paper coatings; and traffic coatings such as those coatings used to provide markings on roads, pavements, and runways.

The following examples are presented to illustrate the process and the composition of the invention. These examples are intended to aid those skilled in the art in understanding the present invention. The present invention is, however, in no way limited thereby.

The following materials were used in the examples:

| | |
|---|---|
| AA | acrylic acid |
| AAEM | acetoacetoxyethyl methacrylate |
| BA | butyl acrylate |
| g | grams |
| MAA | methacrylic acid |
| MMA | methacrylic acid |
| nm | nanometer |
| tBHP | tert-butyl hydroperoxide |
| wt. % | weight % |

Surfactant A 25 weight % aqueous solution of ammonium ethoxylated $C_8$–$C_{18}$ alkyl ether phosphate having 1 to 20 ethylene oxide units per molecule.

Surfactant B 70 weight % aqueous solution of ammonium ethoxylated $C_8$–$C_{18}$ alkyl ether phosphate having 20 to 100 ethylene oxide units per molecule.

Surfactant C 25 weight % aqueous solution of ammonium ethoxylated $C_8$–$C_{18}$ alkyl phenol ether phosphate having 1 to 20 ethylene oxide units per molecule.

Surfactant D 70 weight % aqueous solution of ammonium ethoxylated $C_8$–$C_{18}$ alkyl phenol ether phosphate having 20 to 100 ethylene oxide units per molecule.

EXAMPLE 1

Preparation of Acetoacetoxy Functional Polymers and Aqueous Polymer Dispersions

The aqueous dispersions were prepared in a 5-liter, four necked round bottom flask equipped with a paddle stirrer, a thermometer, a nitrogen inlet, and a reflux condenser.

Comparative A:

A mixture of 43.2 g of Surfactant A and 1000 g of deionized water was added to the flask and heated to 82° C. under a nitrogen atmosphere. A monomer emulsion (ME) was prepared by mixing 520 g of deionized water, 129.6 g of Surfactant A, 972 g BA, 738 g MMA, 36 g AA, and 9 g of 1-dodecanethiol. With the contents of the flask at 78° C., the following materials were added in order: a solution of 3.6 g of ammonium bicarbonate in 30 g of deionized water, a mixture of 80 g of an acrylic polymer emulsion (100 nm, 45 wt. % solids) and 20 g of deionized water, and a mixture of 20 g of a solution of 0.1 wt. % iron sulfate in water, and 1.5 g of a solution of 1 wt. % tetrasodium salt of ethylenediaminetetraacetic acid in water. The ME was then added to the flask over a period of less than 3 hours while maintaining the contents of the flask at a temperature of 80° C. A solution of 3.9 g of 70% tBHP in 100 g of deionized water and a solution of 2.6 g of isoascorbic acid in 100 g of deionized water were coadded along with the monomer emulsion addition over the same length of time. When 75 wt. % of the ME was added, 54 g AAEM was added to the ME container. After the complete addition of the ME, the ME container was rinsed with 50 g of deionized water. After 20 minutes, a solution of 1.0 g of 70% tBHP in 30 g of deionized water and a solution of 0.7 g of isoascorbic acid in 30 g of deionized water were added over a period of less than 60 minutes and the contents of the flask was allowed to cool to 45° C. Next, a solution of 45.7 g of 28% ammonium hydroxide was added and the contents of the flask was filtered to remove any coagulum. The resulting comparative aqueous polymer dispersion, Comparative A, had a pH of 9.1 and 46.5 wt. % solids. Examination of the dispersion with CHDF showed that it has two distinctive modes (34% at 189 nm and 66% at 79 nm by weight).

Example 1.1

An aqueous polymer dispersion was made by addition of a solution of 22.8 g of Surfactant B and a solution of 4 g of 28% ammonium hydroxide in 50 g of deionized water to 1790 g of the Comparative A with stirring. The resulting aqueous polymer dispersion, Example 1.1, had 45.5 wt. % solids.

Comparative B

A comparative aqueous polymer dispersion was prepared according to the general procedure for Comparative A, expect that the monomer emulsion was prepared by mixing 520 g of deionized water, 129.6 g of Surfactant A, 972 g BA, 738 g MMA, 36 g AA, and 13.5 g of 1-dodecanethiol. The resulting comparative aqueous polymer dispersion, Comparative B, had a pH of 9.2 and 46.6 wt. % solids. Examination of the dispersion with CHDF showed that it has two distinctive modes (32% at 186 nm and 68% at 79 nm by weight).

Example 1.2

An aqueous polymer dispersion was made by addition of a solution of 22.2 g of Surfactant B and a solution of 4 g of 28% ammonium hydroxide in 50 g of deionized water to 1749 g of the Comparative B with stirring. The resulting aqueous polymer dispersion, Example 1.2 had 45.5 wt. % solids.

Comparative C

To the flask was added 620 g of deionized water. The contents of the flask was heated to 84° C. under a nitrogen atmosphere. A monomer emulsion (ME) was prepared by mixing 526 g of deionized water, 95.2 g of Surfactant A, 918 g BA, 694.8 g MMA, 25 g MAA, and 8.5 g of 1-dodecanethiol. With the contents of the flask at 84° C., the following materials were added in order: a solution of 6.8 g of ammonium bicarbonate in 30 g of deionized water, a mixture of 78.2 g of an acrylic polymer emulsion (100 nm, 45% solids) and 10 g of deionized water, and 13.6 g of a solution of 0.15 wt. % iron sulfate in water, and 1.36 g of a solution of 1 wt. % tetrasodium salt of ethylenediaminetetraacetic acid in water. The ME was added to the flask over a period of less than 3 hours while maintaining the contents of the flask at a temperature of 80° C. A solution of 4.6 g of 70 wt. % tBHP in 88.4 g of deionized water and a solution of 3.2 g of isoascorbic acid in 88.4 g of deionized water were coadded along with the monomer emulsion addition over the same length of time. When about 4 wt. % of the ME was added to the flask, a solution of 54.4 g of surfactant A in 11 g of deionized water was added to the flask. When 75 wt. % of the ME was added, a mixture of 51 g AAEM, 11.2 g MAA, and 17 g of deionized water was added to the ME container. After the completion of the monomer addition, the ME container was rinsed with 34 g of deionized water. A solution of 0.68 g of tBHP in 5 g of deionized water was added, followed by a solution of 0.37 g of isoascorbic acid in 11 g of deionized water. After 20 minutes, a solution of 0.70 g of 70% tBHP in 7.3 g of deionized water and a solution of 0.46 g of isoascorbic acid in 12.8 g of deionized water were added over a period of less than 60 minutes and the contents of the flask was allowed to cool to a temperature of 45° C. Next, 36.6 g of 28% ammonium hydroxide was added. After dilution with 112 g of deionized water, the contents of the flask was filtered to remove any coagulum. The resulting comparative aqueous polymer dispersion, Comparative C, had a pH of 9, and 50.0 wt. % solids. Examination of the dispersion with CHDF showed that it has two distinctive modes (56% at 244 nm and 44% at 83 nm by weight).

Example 1.3

To the flask was added 620 g of deionized water. The contents of the flask was heated to 84° C. under a nitrogen atmosphere. A monomer emulsion (ME) was prepared by mixing 526 g of deionized water, 95.2 g of Surfactant A, 918 g BA, 694.8 g MMA, 25 g MAA, and 8.5 g of 1-dodecanethiol. With the contents of the flask at a temperature of 84° C., the following materials were added in order: a solution of 6.8 g of ammonium bicarbonate in 30 g of deionized water, a mixture of 78.2 g of an acrylic polymer emulsion (100 nm, 45 wt. % solids) and 10 g of deionized water, 13.6 g of a solution of 0.15 wt. % iron sulfate in water, and 1.36 g of a solution of 1 wt. % tetrasodium salt of ethylenediaminetetraacetic acid in water. The ME was then added to the flask over a period of less than 3 hours at 80° C. A solution of 4.6 g of 70 wt. % tBHP in 88.4 g of deionized water and a solution of 3.2 g of isoascorbic acid in 88.4 g of deionized water were coadded along with the ME addition over the same length of time. When about 4 wt. % of the ME was added to the flask, a solution of 54.4 g of surfactant A in 11 g of deionized water was added to the flask. When 75 wt. % of the ME was added, a mixture of 51 g AAEM, 11.2 g MAA, and 17 g of deionized water was added to the ME container. After the completion of the ME addition, the ME container was rinsed with 34 g of deionized water. A solution of 0.68 g of tBHP in 5 g of deionized water was added, followed by the addition of a solution of 0.37 g of isoascorbic acid in 11 g of deionized water. After 20 minutes, a solution of 0.70 g of 70 wt. % tBHP in 7.3 g of deionized water and a solution of 0.46 g of isoascorbic acid in 12.8 g of deionized water were added over a period of less than 60 minutes. The contents of the flask was cooled to 45° C. Next, 18.7 g of 28% ammonium hydroxide was added. A solution of 48.5 g of Surfactant B and 11.9 g of 28% ammonium hydroxide in 128 g of deionized water were added. The contents of the flask was filtered to remove any coagulum. The resulting aqueous polymer dispersion, Example 1.3, had a pH of 8.7 and 50.4 wt. % solids. Examination of the dispersion with CHDF showed that it has two distinctive modes (57% at 229 nm and 43% at 77 nm by weight).

Comparative D

To the flask was added 620 g deionized water. The contents of the flask were heated to 84° C. under a nitrogen atmosphere. A monomer emulsion (ME) was prepared by mixing 526 g of deionized water, 95.2 g of Surfactant C, 918 g BA, 694.8 g MMA, 25 g MAA, and 8.5 g of 1-dodecanethiol. With the contents of the flask at a temperature of 84° C., the following materials were added in order: a solution of 6.8 g of ammonium bicarbonate in 30 g of deionized water, a mixture of 78.2 g of an acrylic polymer emulsion (100 nm, 45% solids) and 10 g of deionized water, and 13.6 g of a solution of 0.15 wt. % iron sulfate in water, and 1.36 g of a solution of 1 wt. % tetrasodium salt of ethylenediaminetetraacetic acid in water. The ME was then added to the flask over a period of less than 3 hours at 80° C. A solution of 4.6 g of 70 wt. % tBHP in 88.4 g of deionized water and a solution of 3.2 g of isoascorbic acid in 88.4 g of deionized water were coadded along with the monomer emulsion addition over the same length of time. When about 4 wt. % of the ME was added to the flask, a solution of 54.4 g of surfactant C in 11 g of deionized water was added to the flask. When 75 wt. % of the ME was added, a mixture of 51 g AAEM, 11.2 g MAA, and 17 g of deionized water was added to the ME container. After the complete addition of the ME, the ME container was rinsed with 34 g of deionized water. A solution of 0.68 g of tBHP in 5 g of deionized water was added, followed by the addition of a solution of 0.37 g of isoascorbic acid in 11 g of deionized water. After 20 minutes, a solution of 0.70 g of 70 wt. % tBHP in 7.3 g of deionized water and a solution of 0.46 g of isoascorbic acid in 12.8 g of deionized water were added over a period of less than 60 minutes. The contents of the flask was cooled to 45° C. Next, 36.6 g of 28% ammonium hydroxide was added. A solution of 48.5 g of Surfactant D and 11.9 g of 28% ammonium hydroxide in 128 g of deionized water was added. The contents of the flask was filtered to remove any coagulum. The resulting comparative aqueous dispersion, Comparative D, had a pH of 9.2 and 49.8 wt. % solids. Examination of the dispersion with CHDF showed that it has two distinctive modes (58% at 256 nm and 42% at 87 nm by weight).

TABLE 1.1

Weight % $C_8$–$C_{20}$ Alkyl $(EO)_{20-100}$ Phosphate Surfactant in Aqueous Polymer Dispersions and Comparative Aqueous Polymer Dispersions

| Example | $C_8$–$C_{20}$ Alkyl $(EO)_{20-100}$ Phosphate Surfactant (Wt. %)* |
|---|---|
| Example 1.1 | 1.77 |
| Example 1.2 | 1.91 |
| Example 1.3 | 1.95 |
| Comparative A | 0 |
| Comparative B | 0 |
| Comparative C | 0 |
| Comparative D | 0 |

*based on weight of acetoacetoxy functional polymer particles

Example 2

Preparation of Aqueous Coating Compositions

A pigment dispersion was prepared by combining 46.63 g water, 23 g propylene glycol, 8.57 g Tamol™ 681 dispersant (Rohm and Haas Company, Philadelphia, Pa.), 2 g Tergitol™ 15-S-40 surfactant (Union Carbide Company, CT), 3 g Drewplus™ L-475 defoamer (Drew Chemical Corp., NJ), 5 g Acrysol™ RM-2020 thickener (Rohm and Haas Company), and 2 g Skane™ M-8 biocide (Rohm and Haas Company). The vessel was then placed on a bench top mixer and the ammonia was slowly added with stirring to raise the pH to a value of 9. The contents of the vessel was transferred to a COWLES high speed disperser (Cowles Dissolver Company, Inc., NY). While the disperser was operating at low speed (1000 rpm), the dry ingredients were added in the following order; 0.5 g Natrosol™ 250 HR hydroxyethyl cellulose (Aqualon Co, DE), 165 g Ti-Pure™ R-706 titanium dioxide (E.I. Du Pont de Nemours and Company, Wilmington, Del.); 120.84 g Minex™ 4 nepheline syenite (Unimin Canada Ltd., Toronto, Canada), 12 g Kadox™ 915 zinc oxide (G & W Natural Resources Co., TN), and 2 g Attagel™ 50 hydrated aluminum magnesium silicate (Engelhard Corp, NJ).

Aqueous coating compositions were prepared by combining the pigment dispersion with the aqueous polymer dispersion, 4.12 g 2,2,4-trimethyl-1,3-pentanediol monoisobutyrate, 12 g Acrysol™ RM-2020 NPR thickener, 7.84 g Acrysol™ RM-8W thickener, 0.65 g ammonia, and 218.05 g water. The amounts of aqueous polymer dispersion and water added to prepare the aqueous coating composition are listed in Table 2.1

TABLE 2.1

Aqueous Coating Compositions

| Example | Aqueous polymer dispersion | Water |
|---|---|---|
| Example 1.1 | 452.71 g | 218.05 g |
| Example 1.2 | 452.51 g | 254.73 g |
| Example 1.3 | 410.42 g | 285.14 g |

TABLE 2.1-continued

Aqueous Coating Compositions

| Example | Aqueous polymer dispersion | Water |
|---|---|---|
| Comparative A | 442.59 g | 264.68 g |
| Comparative B | 442.31 g | 266.01 g |
| Comparative C | 399.30 g | 298.05 g |
| Comparative D | 411.32 g | 283.34 g |

Example 3

Preparation and Testing of Coated Samples

Test panels having a chalky surface were prepared by applying an exterior latex paint onto primed cedar panels. The exterior latex paint contained 32.3 kilograms per 100 liters (269 pounds of titanium dioxide per 100 gal) of paint and was applied to the primed cedar panels at a spread rate of 11 meter$^2$ per liter (450 square feet per gallon). After drying for at least 12 hours, the panels were exposed outdoors facing south at an angle of 45 degrees at Spring House, Pa., until the exposed panels developed a chalk rating of ASTM 3 or 4 as defined by the ASTM method D 4214 for evaluating the degree of chalk. The substrate was then divided into 5 cm wide strip sections. The aqueous coating compositions were applied as a base coat by brush at an equal spread rate. The spread rate was determined by the weighing of the panel after application of the aqueous coating composition. The application rate was 11 meter$^2$ per liter (450 square feet per gallon). The coated samples were allowed to dry for 4 hours. The aqueous coating composition were then applied as a top coat in the same manner as the base coat. The panels were then dried for approximately 24 hours at 25° C. and 50% relative humidity. The ASTM D-3359 cross hatch tape pull method was used to evaluate adhesion of the dried aqueous coating composition to the chalky substrate. The percent of coating retained after the tape was pulled from the test area was measured. A value of 100 indicated complete adhesion of the dried coating to the chalky substrate. A value of zero indicated complete removal of the dried coating to the chalky substrate. An acceptable level of crosshatch adhesion was a value of at least 70.

TABLE 3.1

Adhesion of Dried Coatings to Chalky Substrate

| Example | Cross Hatch Adhesion | Surfactants |
|---|---|---|
| Example 1.1 | 100 | A, B |
| Example 1.2 | 100 | A, B |
| Example 1.3 | 100 | A, B |
| Comparative A | 0 | A |
| Comparative B | 0 | A |
| Comparative C | 0 | A |
| Comparative D | 20 | C, D |

The results in Table 3.1 show that dried coatings prepared from the aqueous coating compositions that contained acetoacetoxy functional polymer particles and at least one $C_8$–$C_{18}$ alkyl ethoxylated phosphate surfactant having 20 to 100 ethylene oxide group (Surfactant B), as exemplified by Examples 1.1 to 1.3, had acceptable levels of crosshatch adhesion to a chalky substrate. In comparison, the dried coatings prepared from comparative aqueous coating compositions containing the acetoacetoxy functional polymer particles but absent the $C_8$–$C_{18}$ alkyl ethoxylated phosphate surfactant having 20 to 100 ethylene oxide group, as exemplified by Comparatives A to D, had unacceptable levels of crosshatch adhesion to a chalky substrate. Further, the comparative coating prepared from the comparative aqueous coating composition, Comparative D, which contained alkylphenol ethoxylated phosphate surfactants as substitutes for the alkyl ethoxylated phosphate surfactant, Surfactant B, exhibited an unacceptable level of crosshatch adhesion.

What is claimed is:

1. An aqueous polymer dispersion comprising:
   a) an aqueous medium;
   b) acetoacetoxy functional polymer particles dispersed in said aqueous medium; and
   c) at least one alkyl ethoxylated phosphate surfactant comprising a $C_8$ to $C_{18}$ alkyl group attached to a polyoxyethylene chain having an average degree of polymerization in the range of from 20 to 100.

2. The aqueous polymer dispersion according to claim 1 wherein said acetoacetoxy functional polymer particles comprise as polymerized units, based on weight of said acetoacetoxy functional polymer particles:
   a) from 0.1 to 20 weight % acetoacetoxy functional monomer;
   b) from 70 to 99.9 weight % nonionic monomer; and
   c) from 0 to 10 weight % ionic monomer.

3. The aqueous polymer dispersion according to claim 1 wherein said average degree of polymerization of said polyoxyethylene chain is in the range of from 25 to 50.

4. The aqueous polymer dispersion according to claim 1 comprising from 0.1 to 3 weight % said at least one alkyl ethoxylated phosphate surfactant, based on weight of said acetoacetoxy functional polymer particles.

5. The aqueous polymer dispersion according to claim 1 further comprising a material selected from the group consisting of titanium dioxide, zinc oxide, voided polymer particles, clay, and calcium carbonate.

6. A method for preparing a coated substrate, comprising the steps of:
   a) providing an aqueous polymer dispersion comprising: an aqueous medium; acetoacetoxy functional polymer particles dispersed in said aqueous medium; and at least one alkyl ethoxylated phosphate surfactant comprising a $C_8$ to $C_{18}$ alkyl group attached to a polyoxyethylene chain having an average degree of polymerization in the range of from 20 to 100;
   b) applying said aqueous polymer dispersion to a substrate; and
   c) drying or allowing to dry said aqueous polymer dispersion applied to said substrate to provide said coated substrate.

7. The method according to claim 6 wherein said acetoacetoxy functional polymer particles comprise as polymerized units, based on weight of said acetoacetoxy functional polymer particles:
   a) from 0.1 to 20 weight % acetoacetoxy functional monomer;
   b) from 70 to 99.9 weight % nonionic monomer; and
   c) from 0 to 10 weight % ionic monomer.

8. The method according to claims 6 wherein said average degree of polymerization of said polyoxyethylene chain is in the range of from 25 to 50.

9. The method according to claim 6 wherein said aqueous polymer dispersion comprises from 0.1 to 3 weight % said at least one alkyl ethoxylated phosphate surfactant, based on weight of said acetoacetoxy functional polymer particles.

10. An article prepared according to the method of claim 6.

* * * * *